United States Patent
Musacchio et al.

(10) Patent No.: US 11,275,061 B2
(45) Date of Patent: Mar. 15, 2022

(54) RECONFIGURABLE FLUIDIC MANIFOLD FOR A LIQUID CHROMATOGRAPHY SYSTEM

(71) Applicant: Waters Technologies Corporation, Milford, MA (US)

(72) Inventors: Jeffrey Musacchio, Sharon, MA (US); Keith Fadgen, Hope Valley, RI (US); Joseph D. Michienzi, Plainville, MA (US); Stanislaw Koziol, Wrentham, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 248 days.

(21) Appl. No.: 16/545,590

(22) Filed: Aug. 20, 2019

(65) Prior Publication Data

US 2020/0064312 A1 Feb. 27, 2020

Related U.S. Application Data

(60) Provisional application No. 62/720,603, filed on Aug. 21, 2018.

(51) Int. Cl.
*G01N 30/16* (2006.01)
*G01N 30/20* (2006.01)
(Continued)

(52) U.S. Cl.
CPC ....... *G01N 30/16* (2013.01); *G01N 2030/027* (2013.01); *G01N 2030/201* (2013.01); *G01N 2030/324* (2013.01)

(58) Field of Classification Search
CPC .................................................... G01N 30/16
(Continued)

(56) References Cited

U.S. PATENT DOCUMENTS 7,069,952 B1 7/2006 McReynolds et al.
2002/0124896 A1 9/2002 O'Connor et al.
(Continued)

FOREIGN PATENT DOCUMENTS

WO 2017075525 A1 5/2017

OTHER PUBLICATIONS

International Preliminary Report on Patentability in PCT/US2019/047223 dated Mar. 4, 2021.
(Continued)

*Primary Examiner* — John Fitzgerald
*Assistant Examiner* — Rodney T Frank
(74) *Attorney, Agent, or Firm* — Schmeiser, Olsen & Watts LLP; William G. Guerin

(57) ABSTRACT

Described is a fluidic manifold that includes a block formed of multiple layers each bonded to at least one adjacent layer at a layer interface. Bonding may be achieved using a diffusion bonding process. The block includes one or more attachment surfaces and at least two fluidic channels. Each fluidic channel is at least partially disposed at one of the layer interfaces and has a first end at one of the attachment surfaces. Each attachment surface includes an attachment feature at the first end of one of the fluidic channels to enable a fluidic coupling of the two fluidic channels through a fluidic component. Attachment features include, for example, a compression fitting coupling body adapted to receive a conventional seal, such as a ferrule and compression screw, and a fitting body that permits a face seal or gasket seal between the fluidic component and the block.

14 Claims, 9 Drawing Sheets

(51) Int. Cl.
*G01N 30/32* (2006.01)
*G01N 30/02* (2006.01)

(58) Field of Classification Search
USPC .......................................................... 73/61.52
See application file for complete search history.

(56) References Cited

U.S. PATENT DOCUMENTS

| | | |
|---|---|---|
| 2002/0187557 A1 | 12/2002 | Hobbs et al. |
| 2003/0159742 A1 | 8/2003 | Karp et al. |
| 2004/0228771 A1 | 11/2004 | Zhou et al. |
| 2008/0135116 A1 | 6/2008 | Sugiura et al. |
| 2014/0208827 A1 | 7/2014 | Bailey et al. |
| 2014/0234954 A1 | 8/2014 | Lee et al. |
| 2014/0318633 A1* | 10/2014 | Facer ................. B01F 13/0059 137/3 |
| 2014/0345372 A1 | 11/2014 | Gerhardt et al. |

OTHER PUBLICATIONS

International Search Report and Written Opinion in PCT/US2019/047223 dated Nov. 6, 2019; 16 pages.

\* cited by examiner

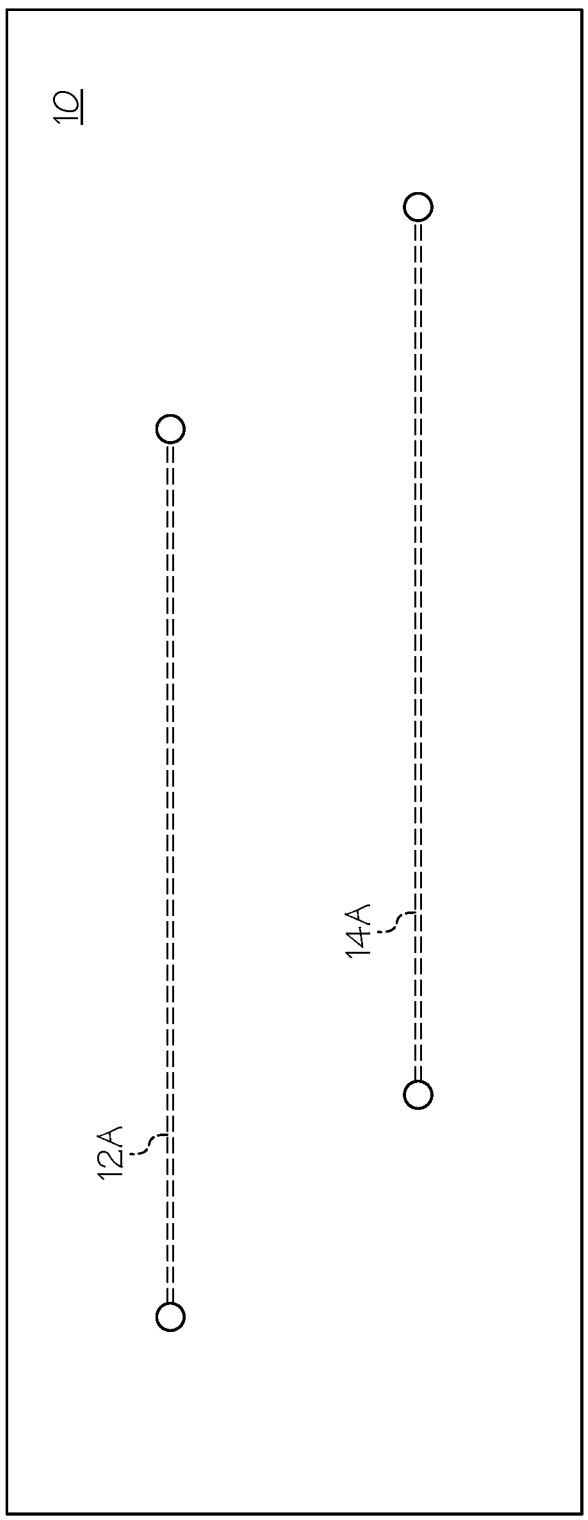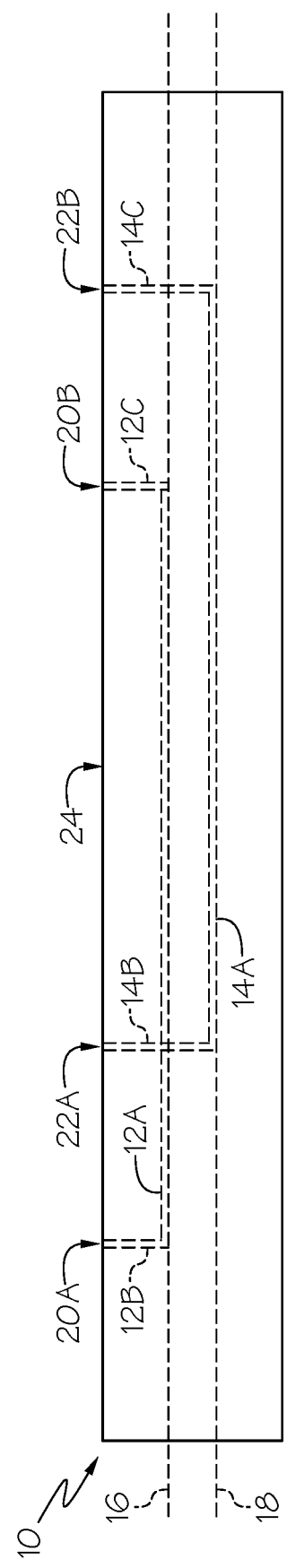
FIG. 1A
FIG. 1B

RECONFIGURABLE FLUIDIC MANIFOLD FOR A LIQUID CHROMATOGRAPHY SYSTEM

CROSS REFERENCE TO RELATED APPLICATIONS

This application claims the benefit of and priority to U.S. Provisional Patent Application No. 62/720,603, filed Aug. 21, 2018, titled "RECONFIGURABLE FLUIDIC MANIFOLD FOR A LIQUID CHROMATOGRAPHY SYSTEM", the entirety of which is incorporated by reference herein.

FIELD OF THE INVENTION

The technology generally relates generally to devices used in fluid chromatography systems. More particularly, the technology relates to a high-pressure liquid chromatography system having fluidic channels formed in a diffusion bonded body.

BACKGROUND

Liquid chromatography systems often include multiple valves coupled to each other with tubes to achieve a desired fluidic path configuration. A large number of tubes may be connected between the valves and other system components to establish the desired fluidic path. The tubes may occupy significant space and contribute to the overall system size. Connections required to connect the tubing may have unswept volumes that may result in carryover and cross-contamination. Moreover, the large number of connections increases the chance of leakage and significant time is typically required to manually install the tubing and complete the connections during instrument assembly.

Each tube has a volume that can vary substantially from the desired tube volume due to the large physical tolerance for the inner diameter (ID) of the tube. Moreover, bending a tube can affect the tube ID. Thus, the chromatographic results obtained with one chromatographic system may differ markedly from the results obtained with a chromatographic system of similar type and configuration due to the differences in the tube volumes according to the ID manufacturing tolerances and different tube bending.

Reconfiguration of a liquid chromatography system is typically achieved by replumbing valves and fittings, often using connections in different system locations. Such situations may require an individual having expertise in the instrument to manually perform the reconfiguration. When personnel without the necessary expertise are not present, such as in a hospital environment, service personnel may travel to where the instrument is located to implement the reconfiguration, resulting in delay and additional expense. Moreover, the number of connections that must be made can be significant and can represent a substantial portion of the time and cost required to set up the liquid chromatography system.

SUMMARY

In one example, a reconfigurable fluidic manifold includes a block comprising a plurality of layers. Each layer is joined by bonding to at least one adjacent one of the other layers at an interface. The block further comprises at least one attachment surface, a first fluidic channel and a second fluidic channel. Each of the first and second fluidic channels is at least partially disposed at one of the interfaces of the layers and has a first end at one of the attachment surfaces. Each of the attachment surfaces has an attachment feature at the first end of a respective one of the first and second fluidic channels to enable a fluidic coupling of the first and second fluidic channels to a fluidic component.

At least one of the first and second fluidic channels may include a horizontal channel portion disposed at one of the layers. The reconfigurable fluidic manifold may include a vertical channel portion extending from the horizontal portion. Both the first and second fluidic channels may include a horizontal channel portion and the reconfigurable fluidic manifold further include a vertical channel portion extending between the horizontal channel portions.

At least two of the layers may have different thicknesses. The fluidic channels may be microfluidic channels. Each layer may be joined by diffusion bonding to at least one adjacent one of the other layers at the interface.

The layers may include ceramic layers and the layers may include metallic layers. The metallic layers may include titanium.

The attachment feature may include a first fluidic coupler disposed at the attachment surface at the first end of the first fluidic channel and be configured for coupling to a first external fluidic path, and further include a second fluidic coupler disposed at the attachment surface at the first end of the second fluidic channel and configured for coupling to a second external fluidic path. At least one of the first and second fluidic couplers may be a compression fitting coupling body. The first and second fluidic couplers may be brazed to the attachment surface. Alternatively, the first and second fluidic couplers may be soldered to the attachment surface.

The reconfigurable fluidic manifold may further include the fluidic component attached to the attachment surface wherein the fluidic component has a first port in fluidic communication with the first end of one of the fluidic channels. A gasket may be disposed between the fluidic component and the attachment surface. The fluidic component may include a fluidic jumper having a second port that is in fluidic communication with the first end of one of the other fluidic channels. The fluidic component may include a trap column having a second port that is in fluidic communication with the first end of one of the other fluidic channels. The fluidic component may include a sample loop having a second port that is in fluidic communication with the first end of one of the other fluidic channels. The fluidic component may include a reconfigurable valve having a second port and a third port that are in fluidic communication with a second one and a third one, respectively, of the fluidic channels wherein, when the reconfigurable valve is in a first state, the first port is in fluidic communication with the second port, and wherein, when the reconfigurable valve is in a second state, the first port is in fluidic communication with the third port. The reconfigurable valve may be a rotary shear seal valve.

In another example, a pump head assembly includes a block and a plunger chamber. The block has a plurality of layers each joined by bonding to at least one adjacent one of the layers at an interface. The block also has a plurality of surfaces, a first fluidic channel and a second fluidic channel. Each of the first and second fluidic channels has a first end and a second end, and each of the first and second fluidic channels is at least partially disposed at one of the interfaces of the layers. The plunger chamber extends from one of the surfaces into the block. A first end of a first one of the fluidic channels is in fluidic communication with the plunger chamber to deliver a fluid to the plunger chamber and a first end of a second one of the fluidic channels is in fluidic communication with the plunger chamber to receive a fluid from the plunger chamber.

Each layer may be joined by diffusion bonding to at least one adjacent one of the other layers at the interface. The fluidic channels may be microfluidic channels.

One of the surfaces of the block may have a check valve receptacle configured to receive a check valve.

The block may include a pressure sensor cavity disposed in one of the first and second fluidic channels.

The pump head assembly may further include an inlet port disposed at a second end of the first one of the fluidic channels at one of the surfaces of the block and be configured to receive the fluid from an external source. The pump head assembly may further include an outlet port disposed at a second end of the second one of the fluidic channels at one of the surfaces of the block and be configured to deliver a pressurized fluid.

In another example, a valve fluidic manifold includes a block and a reconfigurable valve. The block includes a plurality of layers each joined by bonding to at least one adjacent one of the other layers at an interface. The block further includes an attachment surface, a first fluidic channel and a second fluidic channel. Each of the first and second fluidic channels is at least partially disposed at one of the interfaces of the layers and has a first end at the attachment surface. The reconfigurable valve is attached to the attachment surface of the block and is in fluidic communication with the first and second fluidic channels at the first ends. When the reconfigurable valve is in a first valve state, the first fluidic channel and the second fluidic channels are in fluidic communication to permit a flow of fluid from the first fluidic channel to the second fluidic channel through the reconfigurable valve. When the reconfigurable valve is in a second valve state, the flow of fluid from the first fluidic channel to the second fluidic channel through the reconfigurable valve is prevented.

Each layer may be joined by diffusion bonding to at least one adjacent one of the other layers at the interface. The fluidic channels may be microfluidic channels and the reconfigurable valve may be a rotary valve.

The reconfigurable valve may be a first reconfigurable valve, and the valve fluidic manifold may further include a third fluidic channel and a second reconfigurable valve. The third fluidic channel may be at least partially disposed at one of the interfaces of the layers and have a first end and a second end at the attachment surface. The first reconfigurable valve may be in fluidic communication with the third fluidic channel at the first end and the second reconfigurable valve may be in fluidic communication with the third fluidic channel at the second end. When the second reconfigurable valve is in a first valve state, the second fluidic channel and the third fluidic channel are in fluidic communication to permit a flow of fluid between the second fluidic channel and the third fluidic channel through the second reconfigurable valve. When the second reconfigurable valve is in a second valve state, the flow of fluid between the second fluidic channel and the third fluidic channel through the second reconfigurable valve is prevented.

In another example, a differential flow sensor includes a block and a first, second and third pressure sensor. The block includes a plurality of layers each joined by bonding to at least one adjacent one of the layers at an interface. The block has a plurality of surfaces, a first fluidic channel including a first restrictor of a first length, a second fluidic channel including a second restrictor of a second length that is greater than the first length, and a third fluidic channel in fluidic communication at one end with an end of each of the first and second fluidic channels. Each of the first, second and third fluidic channels is at least partially disposed at one of the interfaces of the layers. The first, second and third pressure sensors are disposed in the first, second and third fluidic channels, respectively.

Each layer may be joined by diffusion bonding to at least one adjacent one of the other layers at the interface. The fluidic channels may be microfluidic channels.

BRIEF DESCRIPTION OF THE DRAWINGS

The above and further advantages of examples of the present inventive concepts may be better understood by referring to the following description in conjunction with the accompanying drawings, in which like reference numerals indicate like elements and features in the various figures. Appended alphabetic characters are used to distinguish between two or more like elements or features in a drawing. For clarity, not every element may be labeled in every figure. The drawings are not necessarily to scale, emphasis instead being placed upon illustrating the principles of features and implementations.

FIGS. 1A and 1B are a top view and side view, respectively, of an example of a diffusion bonded fluidic manifold having two fluidic channels.

DETAILED DESCRIPTION

Figure 2A:
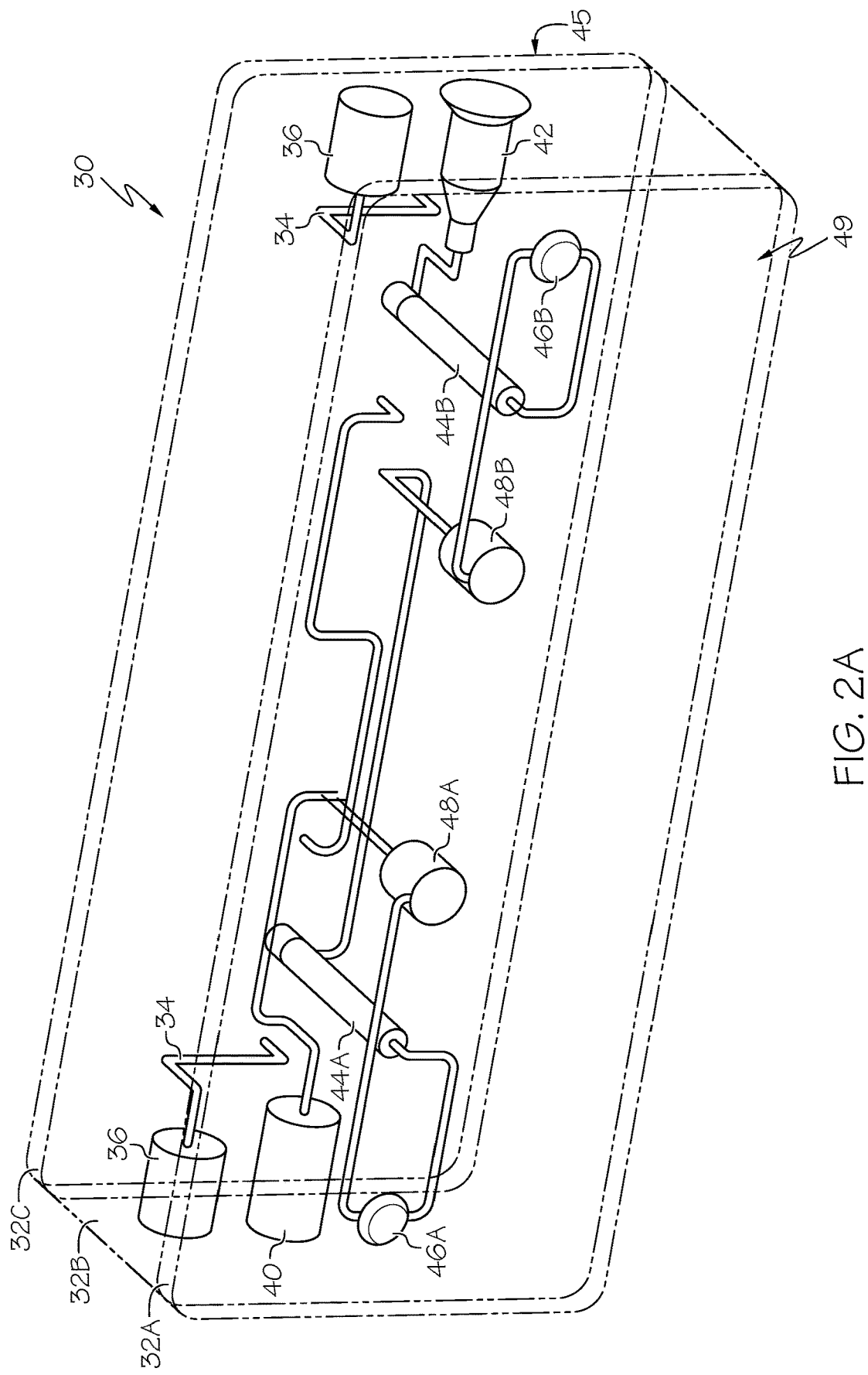
FIG. 2A shows an example of a diffusion bonded fluidic manifold block configured as a pump head manifold and shown as transparent block to enable viewing of internal features.

Reference in the specification to "one example" or "an example" means that a particular feature, structure or characteristic described in connection with the example is included in at least one example of the teaching. References to a particular example within the specification do not necessarily all refer to the same example.

In brief overview, examples disclosed herein are directed to a diffusion bonded fluidic manifold for a liquid chromatography system. The fluidic manifold can be provided in the form of a block that fluidically couples two or more of the components of the liquid chromatography system to each other. As used herein, a block means a piece of hard material having at least one flat surface. The fluidic manifold allows for convenient reconfiguration of the liquid chromatography system to achieve different functionalities. For example, one or more fluidic jumpers attached to a surface of the fluidic manifold block can be used to define the flow paths through the fluidic manifold. As used herein, a fluidic jumper refers to a component that is configured to directly couple at least two ports on the surface of the block. Alternatively, system components can easily be secured to or removed from a surface of the fluidic manifold block to achieve the desired functionalities. An additional advantage is the tighter tolerance achieved on the dimensions of the fluidic channels which reduces variations in chromatographic results due to variations in fluid channels volumes between different chromatography systems using the diffusion bonded fluidic manifold.

The configuration of the fluidic manifold may be performed as part of the assembly of a liquid chromatography instrument. The network of fluidic channels in the manifold reduces the tubing and associated connections that are added to the system during the assembly process. The low number of external fluidic connections results in a reduction in dispersion and a reduced occurrence of leakage. Reconfiguration of the fluidic manifold can be performed, for example, after the fluidic manifold configured for a different use has been used in a chromatographic system. For example, reconfiguration of an operational liquid chromatography system can be performed at its location of use. Reconfiguration of the liquid chromatography system is less complex and may be performed by untrained personnel at the location of use, thereby avoiding the need for service personnel to travel to the location to perform the reconfiguration. For example, a system located in a hospital or doctor's office may be reconfigured by local staff, resulting in less delay and cost.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

The examples described below include the use of a fluidic manifold that includes a block formed of multiple layers. Each layer is bonded to at least one adjacent layer at a layer interface. The block includes one or more attachment surfaces and at least one fluid channel where each fluidic channel is at least partially disposed at one of the interfaces. Each fluidic channel has a first end at one of the attachment surfaces. Each attachment surface has an attachment feature at the first end of one of the fluid channels to enable a fluidic coupling of the fluidic channel to a fluidic component. The fluidic manifold can quickly and easily be reconfigured for different functionalities by removal and/or attachment of fluidic components. Thus, various fluidic systems, such as liquid chromatography systems, can be easily reconfigured for different purposes.

The fluidic manifold block may be fabricated using a solid-state diffusion bonding process in which two or more parallel layers of material are joined together. For example, the layers may be metallic layers and may include titanium or titanium alloy sheets, or stainless steel sheets. Alternatively, the layers may include ceramics or polymer materials. The thickness of the layers may be different.

The term microfluidic channel is used herein to refer to a flow path suitable for capillary scale or nanoscale separations where a transverse dimension of the channel is typically in a range of a few microns to hundreds of microns. Microfluidic channels can be formed at the horizontal interface of two adjacent layers and can further include vertical channels portions extending from one or both ends of the horizontal portion, and/or at one or more locations along the horizontal length of the channel. In one example, the microfluidic channel is formed as a groove along the surface of one layer before the layers are stacked for the diffusion bonding process. In an alternative example, the microfluidic channel is formed by forming a groove in a surface of each of the two layers. When the layers are subsequently stacked with the two surfaces in abutment, the grooves are aligned to each other to define a single microfluidic channel. In another alternative example, a microfluidic channel is defined by an intervening layer disposed between the two adjacent layers at an interface. The microfluidic channel is formed by a vertical opening through the full thickness of the intervening layer with the vertical opening extending along the length of the channel path. The middle layer is then "sandwiched" between the other two layers prior to the diffusion bonding. The resulting microfluidic channel has a cross-section along its length with a horizontal dimension according to the width of the cut and a vertical dimension based on the thickness of the intervening layer.

FIGS. 1A and 1B show a top view and side view of a simple example of a diffusion bonded fluidic manifold 10 having two distinct fluidic channels 12 and 14. The fluidic manifold 10 is in the form of a block having six flat sides (e.g., a "brick"). Each channel 12 and 14 includes a horizontal channel portion (designated by double-dashed lines 12A and 14A) inside the block with a vertical channel portion (designated by double-dashed lines 12B, 12C, 14B or 14C) extending from one end of the horizontal channel 12A or 14A to a surface of the block. One horizontal channel portion 12A is formed at the interface (dashed line 16) between the upper layer and middle layer of the block and the other horizontal channel portion 14A is formed at the interface (dashed line 18) of the middle layer and the bottom layer of the block. It should be noted that these layers are no longer physical distinct in the block after completion of the diffusion bonding process.

The vertical channel portions 12B, 12C, 14B and 14C terminate at ports 20A, 20B, 22A and 22B, respectively, on the attachment surface 24 of the manifold block 10 and may be formed by various means, for example, by conventional drilling techniques through the upper layer before diffusion bonding. Horizontal and vertical channel portions may be formed, for example, by machining processes (computer numerical control (CNC) machining) using a ball end mill or square end mill. Alternatively, or in addition, a chemical etching process may be used to form channel portions. In other examples, horizontal channel portions are formed at multiple interfaces within the block such that channels at one interface pass over or under channels formed at a different interface without interfering with each other. In other examples, a vertical channel portion may extend upward or downward from one horizontal channel portion to a horizontal channel portion of a different channel, to a feature formed within the block or to the bottom surface of the manifold block. In still other examples, a horizontal channel portion may terminate at a horizontal channel portion of a different fluidic channel or at a side surface of the manifold block.

Prior to performing the diffusion bonding process to form the manifold block, the individual layers may be processed to achieve mating surfaces that are flat and have low surface roughness. During the diffusion bonding process, the layers are forced against each other under pressure at an elevated temperature.

Depending on the number of layers, a large number of microfluidic channels may be formed and complex fluidic channel networks defined. These internal or "embedded" microfluidic channels, can be used to communicate fluids between different fluidic components that are attached or otherwise secured to the one or more attachment surfaces of the block. By way of non-limiting examples, a fluidic component may be a chromatographic column, a sample loop, a trap column, a reconfigurable valve (e.g., rotary shear seal valve), or other component of a liquid chromatography system. The fluidic component may be a replaceable component. For example, an attached trap column can be replaced with a new trap column or a regenerated trap column when the attached trap column becomes less efficient. Alternatively, internal microfluidic channels may be coupled to each other through a fluidic component on an attachment surface of the block. For example, a fluidic jumper may be manually attached to or repositioned on an attachment surface to change an internal fluidic path. Fluidic paths that are not inside the manifold block are generally referred to herein as external fluidic paths. Alternatively, an attached valve may be changed to a different state to reconfigure one or more fluidic paths without the need for manual reconfiguration of the fluidic paths.

Fluidic components may be fluidically coupled to a channel 12 or 14 of the diffusion bonded manifold block 10 using an attachment feature located on the attachment surface at one of the ports 20 or 22. The attachment feature may include a fluidic coupler. For example, the fluidic coupler can be a compression fitting coupling body adapted to receive a conventional seal such as a ferrule and compression screw; however, in alternative examples, fluidic components are attached directly (e.g., via a face seal) to an attachment surface of the diffusion bonded manifold. In another example, a fluidic component is bolted through a gasket to a surface of the manifold such that a port on the component is aligned with a corresponding port at the attachment surface of the manifold block 10. The gasket enables a fluid-tight seal between the fluidic component and the diffusion bonded manifold block 10. By way of a specific example, the fluidic component may be a rotary shear seal valve where the gasket is placed between a valve stator which is subsequently bolted to the attachment surface of the manifold block. The gasket may be formed of plastic or another complaint material that is compatible with the liquid conducted through the channels. The gasket includes holes aligned with corresponding ports on the stator and on the attachment surface of the fluidic manifold block. The holes are sized to approximately match the size of the ports on the block and on the fluidic component. For chromatographic systems, larger holes may create dead volumes that can lead to carryover that degrades chromatographic performance. Smaller holes may be acceptable as long as any additional restriction on fluid flow through the gasket is minor and has insignificant impact on chromatographic performance. The gasket may further include alignment openings, such as circular holes and/or slots, to pass alignment features (e.g., alignment pins) to ensure proper registration between the block and the stator. In an alternative example, a reusable compression fitting may be bolted closed or clamped together to connect the component directly to the diffusion bonded manifold. In one implementation of the alternative example, a standard V-detail fitting port is bolted to the manifold with a gasket disposed between the fitting port and the attachment surface. In another implementation, a face seal fitting port is bolted to the manifold to allow a direct connection between a conduit and the attachment surface. This example avoids any need to produce a manifold with permanently attached fitting ports which, if damaged, can render the manifold useless.

In another implementation, two or more diffusion bonded fluidic manifolds may be diffusion bonded to each in a second diffusion bonding process. For example, ports in a surface of a first fluidic manifold are aligned to counterpart ports in a surface of a second fluidic manifold. The two fluidic manifolds are then diffusion bonded at the abutting surfaces to create a single structure. The two fluidic manifold blocks to be bonded together need not be parallel to each other. For example, the (first) fluidic manifold block 10 of FIGS. 1A and 1B may be bonded to a similarly shaped (second) fluidic manifold block that includes one or more ports on one of its four sides. The manifold blocks are orthogonally arranged with respect to each other so that at least one of the ports in the top surface of the first fluidic manifold block is aligned to at least one port in the side surface of the second fluidic manifold block before performing the second diffusion bonding process.

In other examples, a portion of a fitting is brazed, soldered or diffusion bonded to an attachment surface of the manifold block. The brazed, soldered or diffusion bonded portion of the fitting is used to receive a complementary portion of the fitting in a manner similar to the use of a fitting for connecting two separate elements of tubing. More specifically, an external portion of the fitting attached near the end of a piece of tubing may be threaded into the brazed, soldered or diffusion bonded portion of the fitting on the attachment surface. Advantageously, if the external portion of the fitting is damaged, it can be replaced by a similar external portion without affecting the integrity of the fluidic manifold. In yet another example, a component can be permanently bonded to an attachment surface, for example, by direct brazing, soldering or diffusion bonding of the component to the attachment surface. This latter example may be preferable when there is no need to later remove the component and the fluidic manifold will not require future reconfiguration.

In the example of a diffusion bonded fluidic manifold 10 shown in FIGS. 1A and 1B, the ends of the fluidic channels 12 and 14 are on a common attachment surface. In alternative examples, there are one or more additional attachment surfaces. In one such example, fluidic components are attached to opposing (e.g., top and bottom) surfaces of the fluidic manifold block. More generally, fluidic components may be attached to any number of different attachment surfaces of a fluidic manifold block as long as the surface includes the end of a fluid channel to be coupled to the fluidic component.

The following examples of a pump head manifold, a differential flow sensor and a valve manifold illustrate examples of how a diffusion bonded fluidic manifold having microfluidic channels can be advantageously used in a liquid chromatography system. It will be recognized that other configurations of these components are possible as well as configuration of other types of chromatographic components with diffusion bonded fluidic manifolds. Moreover, the examples may be extended to applications using different channel sizes such as channels having larger dimensions than those used for capillary and nanoscale applications.

Pump Head Manifold

Figure 2B:
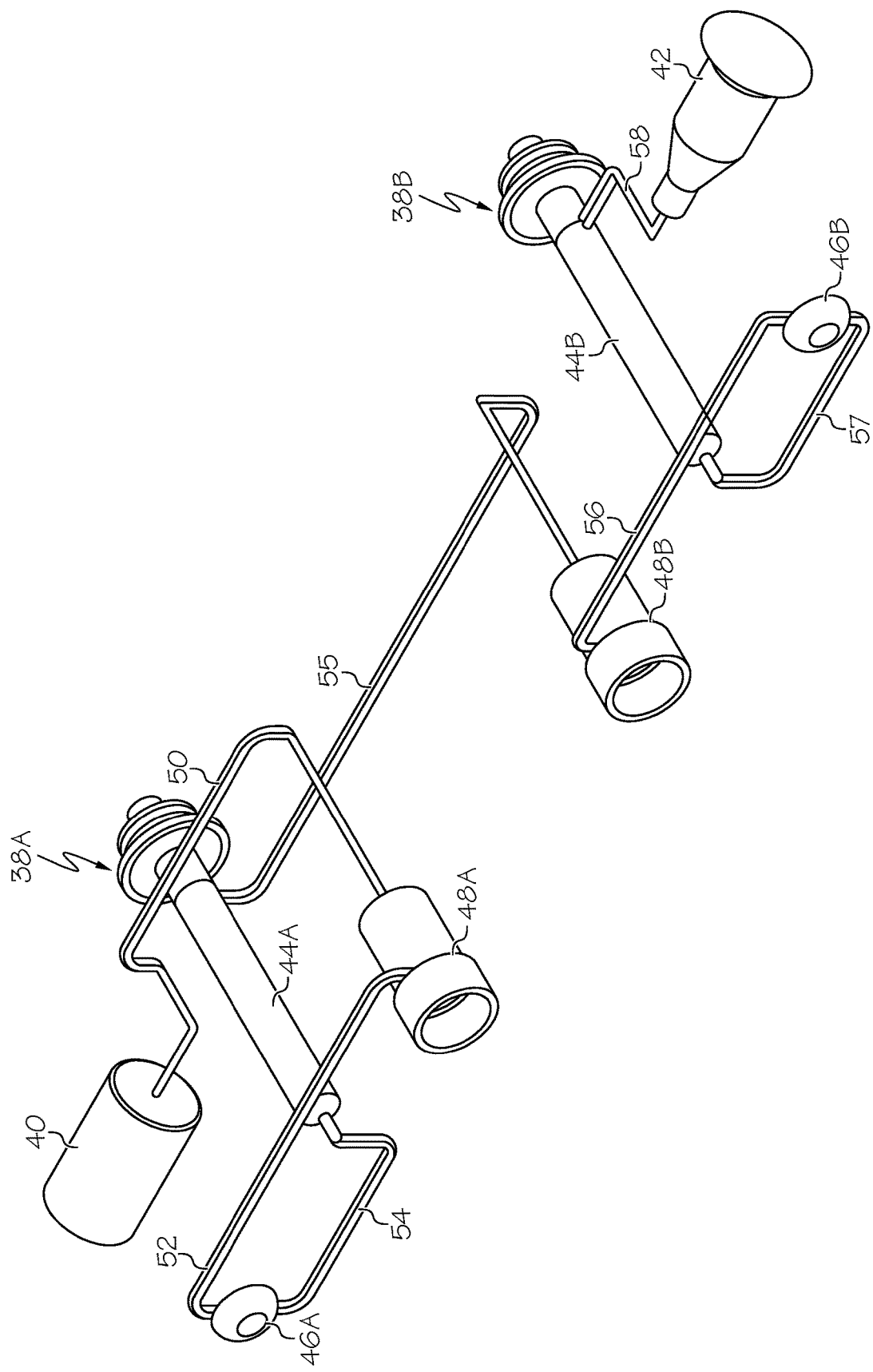
FIG. 2B shows the open volume of the manifold block of FIG. 2A with the layer boundaries, seal wash channels and ports omitted for clarity.

FIG. 2A shows an example of a diffusion bonded fluidic manifold block configured as a pump head manifold 30. The fluidic manifold 30 is formed from three layers 32A, 32B and 32C bonded into a single block, for example, by using a diffusion bonding process. The fluid manifold 30 includes horizontal channel portions formed in each of two planes where each plane is defined at the interface of two layers as the layers existed prior to the diffusion bonding. One interface is at the boundary between layers 32A and 32B and the other interface is at the boundary between layers 32B and 32C. FIG. 2B shows the open volume (i.e., no solid material) of the pump head manifold 30 with the three layers 32 and seal wash channels 34 and seal wash ports 36 removed for clarity. FIG. 2B also shows open volumes 38A and 38B that are present in a pump actuator block (not shown in FIG. 1A) described below that abuts the exposed surface of layer 32C.

The pump head manifold 30 includes an inlet port 40 on a side attachment surface, an outlet port 42 on an opposite side attachment surface, plunger chambers 44 extending from a back surface 45, pressure sensor cavities 46 and check valves receptacles 48. The inlet and outlet ports 40 and 42 may be configured for different types of external coupling and may be threaded to engage a complimentary coupling element. For example, the outlet port 42 may receive an end portion of tubing having a ferrule and compression nut. The check valves are accessible inside the check valve receptacles 48 formed in the front surface 49 of the manifold 30. This enables a check valve to be replaced during routine maintenance or when a check valve malfunction occurs. One plunger chamber 44A may be used with a primary plunger and the other plunger chamber 44B may be used with an accumulator plunger. The pressure sensors cavities are 46 embedded in the block and are therefore not accessible. A strain gage (not shown) on the surface above each cavity is used to measure the deflection of the cavity 46.

When configured for operation in a pump system, the pump head manifold 30 is secured to a separate pump actuator block that has a surface configured to abut the back surface 45. For example, the pump head manifold 30 is secured by bolts or by one or more clamping devices. Two plungers extend from the pump actuator block, each through one of the recessed regions (open volume 38) in the pump actuator bloc surface. Each plunger extends into one of the plunger chambers 44. A high pressure seal in each recessed region 38 seals against the outer diameter of the plunger and an inner surface of the pump actuator block. The recessed region 38 is readily accessible when the manifold block 30 and pump actuator block are separated to permit removal and replacement of the high pressure seals.

During operation of the pump system, a fluid is drawn in through the inlet port 40, microfluidic channel 50, primary check valve, microfluidic channel 52, pressure sensor cavity 46A and microfluidic channel 54 before entering the plunger chamber 44A. Pressurized fluid flows from the plunger chamber 44A through microfluidic channel 55, accumulator check valve, microfluidic channel 56, pressure sensor cavity 46B and microfluidic channel 57 before entering the second plunger chamber 44B. Pressurized fluid exits the second plunger chamber 44B through microfluidic channel 58 before passing through the outlet port 42. As illustrated, the microfluidic channels 55 and 58 are directly to the pump chambers 44A and 44 B, respectively. In an alternative implementation, the microfluidic channels 55 and 58 have ports on the back surface 45 of the manifold 30 which directly couple to the recessed regions 38 in the pump actuator block or to microfluidic channels in the pump actuator block that communicate with the recessed regions 38.

When configured as a serial primary and accumulator pump system, the volume of the first plunger chamber 44A may be substantially larger (e.g., approximately twice the volume) than the volume of the second plunger chamber 44B. Other implementations of a pump head manifold are possible. In one example, the pump head manifold 30 can be secured to two distinct pump actuator blocks each having an abutting surface and a single plunger. In another example, a single plunger pump system may employ a pump head manifold block that includes microfluidic channel 55 with an outlet port at one end, and other channels and components that are shown as upstream of the microfluidic channel 55.

Valve Manifold

Figure 3:
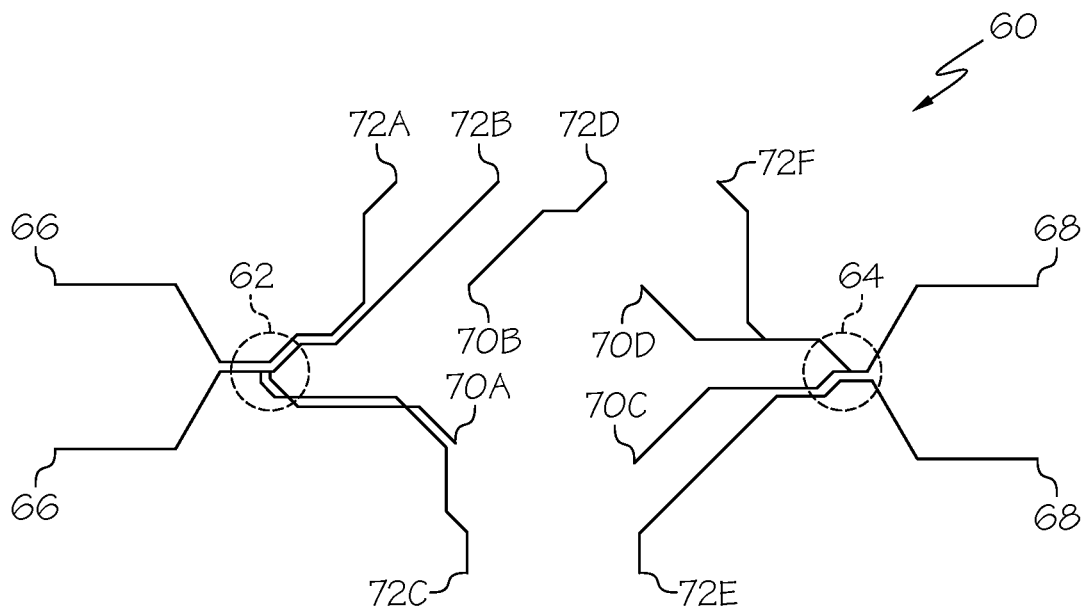
FIG. 3 is a schematic diagram of the fluidic channels in an example of a valve fluidic manifold for a liquid chromatography system.

FIG. 3 illustrates the fluidic channels in an example of a valve fluidic manifold 60 for a liquid chromatography system. The figure corresponds to a top down view of the manifold 60 in which the diffusion bonded material is not shown and where the horizontal channel portions of the fluidic channels are shown as interconnected line segments. The fluidic channels are formed at multiple interfaces therefore there are locations in the figure where fluidic channels appear to intersect. These apparent intersections correspond to regions where one microfluidic channel passes over the other microfluidic channel. There are two locations, shown by dashed circles 62 and 64, at which six line segments appear to terminate in close proximity. Each of the six terminations corresponds to the location of a vertical channel portion that extends from the end of the corresponding horizontal channel portion to an upper attachment surface of the fluidic manifold block 60. Vertical channel portions similarly extend from the ends of the other horizontal channel portions to ports on the upper attachment surface or other attachment surfaces on the manifold block 60. In the various uses of the valve fluidic manifold 60 as described below, one pair of ports 66 is used to couple to an external sample loop and another pair of ports 68 is used to couple to an external trap. There are additional ports 70 on the upper attachment surface that can be used with fluidic jumpers to define certain fluidic paths. A fluidic jumper enables a fluidic coupling between any two of the microfluidic channels terminating at one of the ports 70. The remainder of the ports 72 shown in the figure are provided on the upper attachment surface and are used for coupling to various portions or components of the chromatographic system such as a solvent source, a waste channel and a chromatographic column.

A reconfigurable valve, such as a rotary valve (e.g., a rotary shear seal valve), can be attached to the fluidic manifold at each location 62 and 64 so that microfluidic channels can be interconnected in a reconfigurable manner to define desired fluidic paths through the valve manifold 60. The reconfigurable valve enables a flow of fluid from one microfluidic channel through the valve to a different microfluidic channel when the valve is configured in a first valve state. The reconfigurable valve can be commanded to a second valve state to prevent the flow of fluid between the two microfluidic channels. The rotary shear seal valves, fluidic jumpers and external components can be secured to the valve manifold block 60 using, for example, gaskets and bolts.

In some examples, the valve fluidic manifold 60 is configured as part of a chromatographic system at a manufacturing facility so that the external ports 72 are coupled to components of a chromatographic system. This may further include securing the two rotary valves to the manifold 60.

Some or all of ports 66, 68 and 70 may remain available for the end user to configure for a particular use. For example, ports associated with a sample loop, trap and jumper locations may be available for manual configuration at the end user site.

Figure 4:
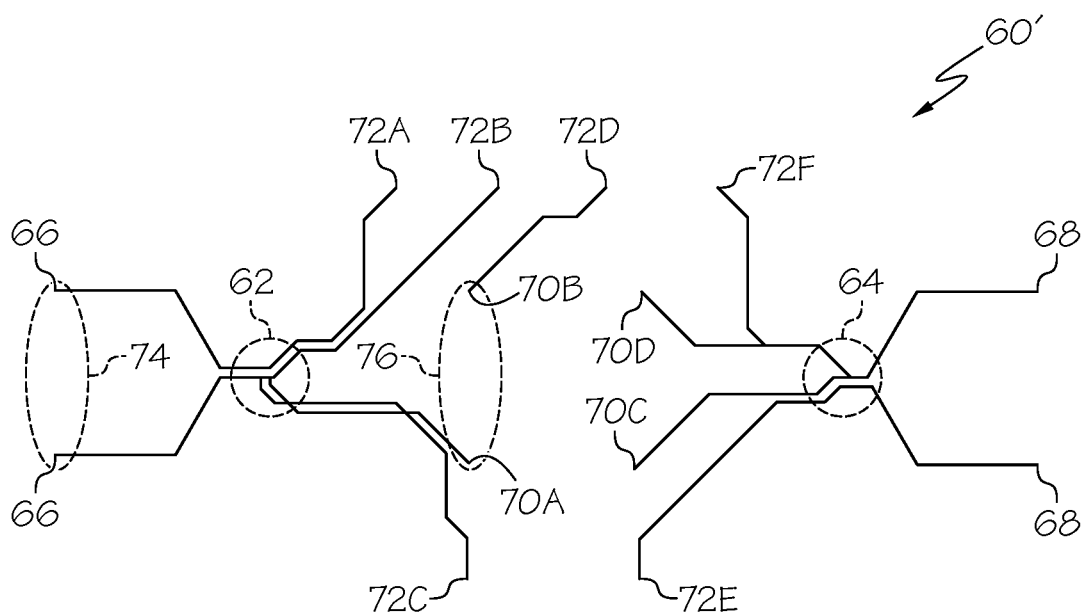
FIG. 4 is a schematic diagram showing the manual configuration of a valve fluidic manifold for a direct injection procedure.

FIG. 4 schematically illustrates the manual configuration of a valve fluidic manifold 60' for a direct injection procedure. An external sample loop 74 is fluidically coupled between a pair of ports 66 and a fluidic jumper 76 interconnects another pair of ports 70A and 70B. The sample loop 74 may include a length of external tubing used to receive a volume of sample during a load procedure and to hold, or store, the sample for injection into a chromatographic flow.

Figure 5A:
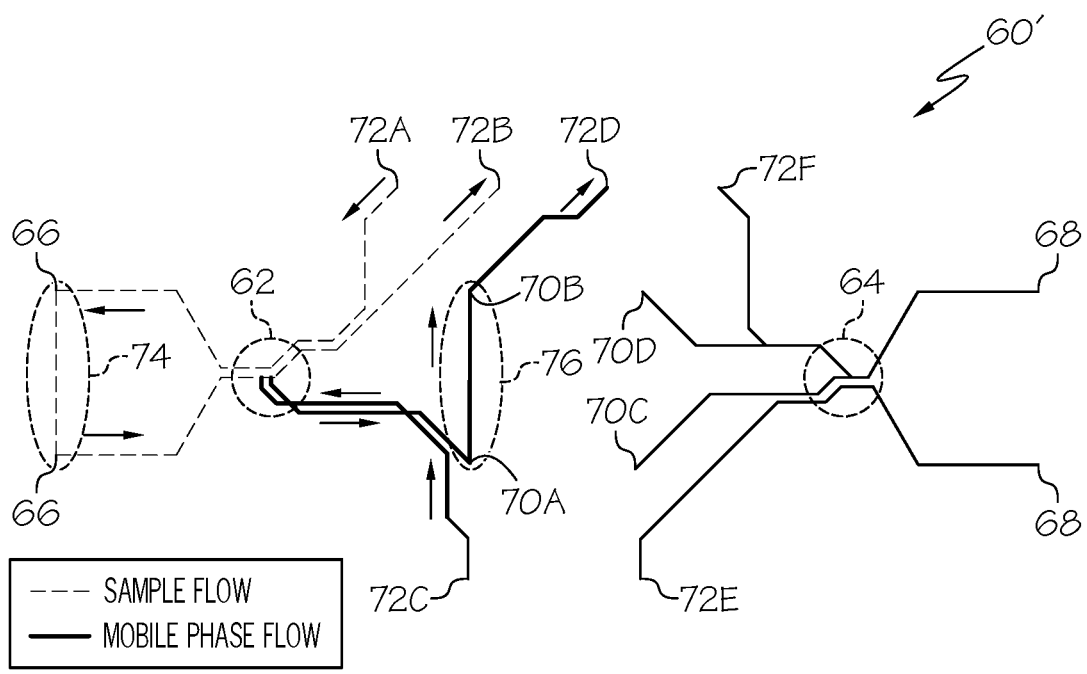
FIGS. 5A, 5B and 5C are schematic depictions of the flows conducted through the valve fluidic manifold of FIG. 4 for different steps in a direct injection procedure.
Figure 5B:
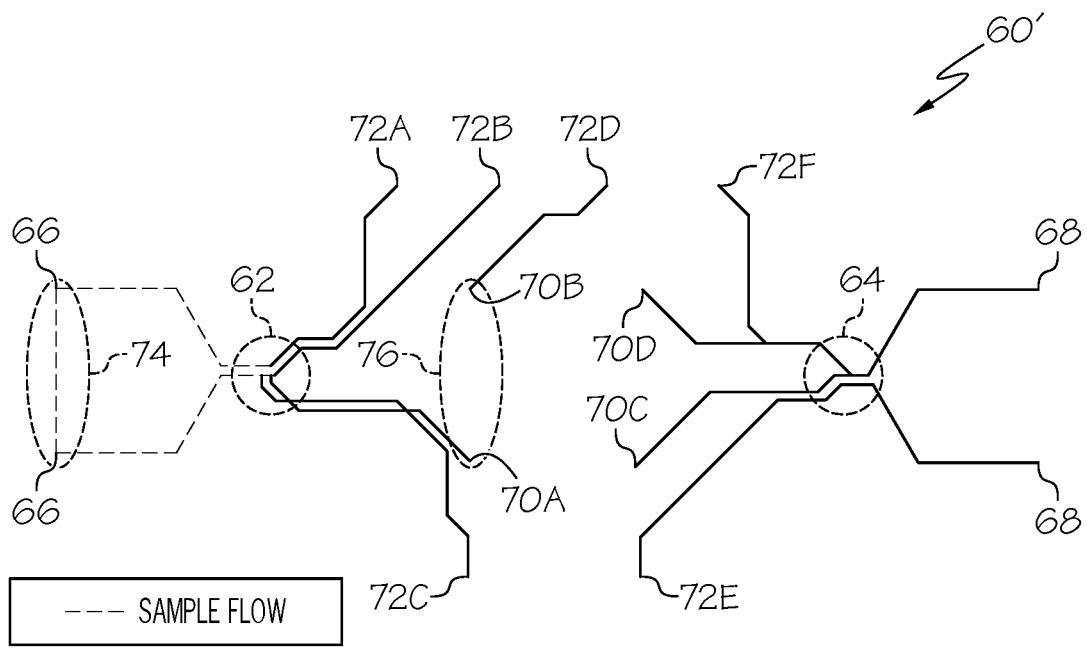
Figure 5C:
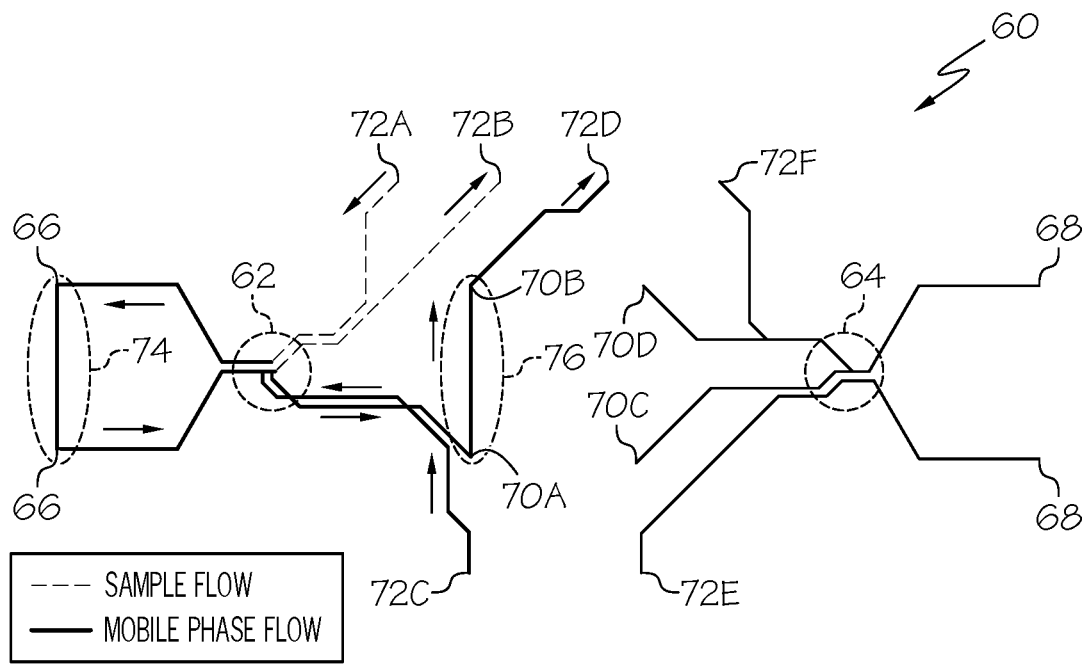

FIGS. 5A to 5C are schematic depictions of the flows conducted through the valve fluidic manifold 60' of FIG. 4 for a direct injection sequence. In FIGS. 5A and 5C, bold line segments indicate active flow paths with arrows used to indicate the direction of flow. A flow of sample received at port 72A is conducted by way of intervening fluidic channels through the rotary valve at location 62, through the external sample loop 74, through the rotary valve a second time, and out through port 72B to waste. At the same time, a mobile phase comprising one or more solvents received at port 72C is conducted through intervening fluidic channels through the rotary valve, through the fluidic jumper 76 and out through port 72D.

By completion of the loading step, the external sample loop 74 and the fluidic channels that couple the sample loop 74 to the rotary valve are filled with a known volume of sample, as shown by the bolded line segments in FIG. 5B. Subsequently, the rotary valve is switched to reconfigure the fluidic paths as shown in FIG. 5C so that the mobile phase received at port 72C is conducted through the rotary valve and through the external sample loop 74 such that the known volume of sample is pushed through the rotary valve and the fluidic jumper 76 before exiting at port 72D where the flow continues to the chromatographic column.

Figure 6:
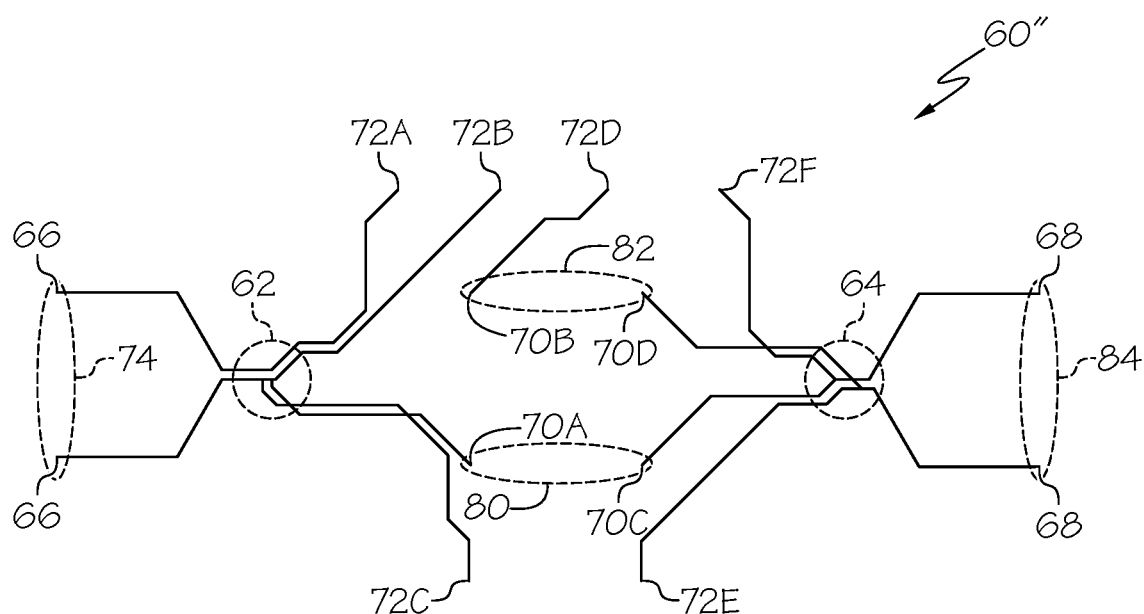
FIG. 6 is a schematic depiction of the manual configuration of a valve manifold for use in a procedure in which a sample containing at least one analyte and additional components is retained on a trap column before eluting in a second flow to a chromatography column.

FIG. 6 is a schematic illustration of the manual configuration of a valve manifold 60" for use in a procedure in which a sample containing one or more analytes of interest and additional components in a first flow is retained on a trap column before eluting in a second flow that is conducted from the valve manifold 60" to a chromatography column (not shown). It will be noted that the valve manifold block is the same as that used in the example of FIG. 4 through FIG. 5C except that the attached component configuration is different. As in the prior example, an external sample loop 74 is fluidically coupled between a pair of ports 66; however, a first fluidic jumper 80 couples ports 70A and 70 C, a second fluidic jumper 82 couples ports 70B and 70D, and a trap column 84 couples the pair of ports 68.

Figure 7A:
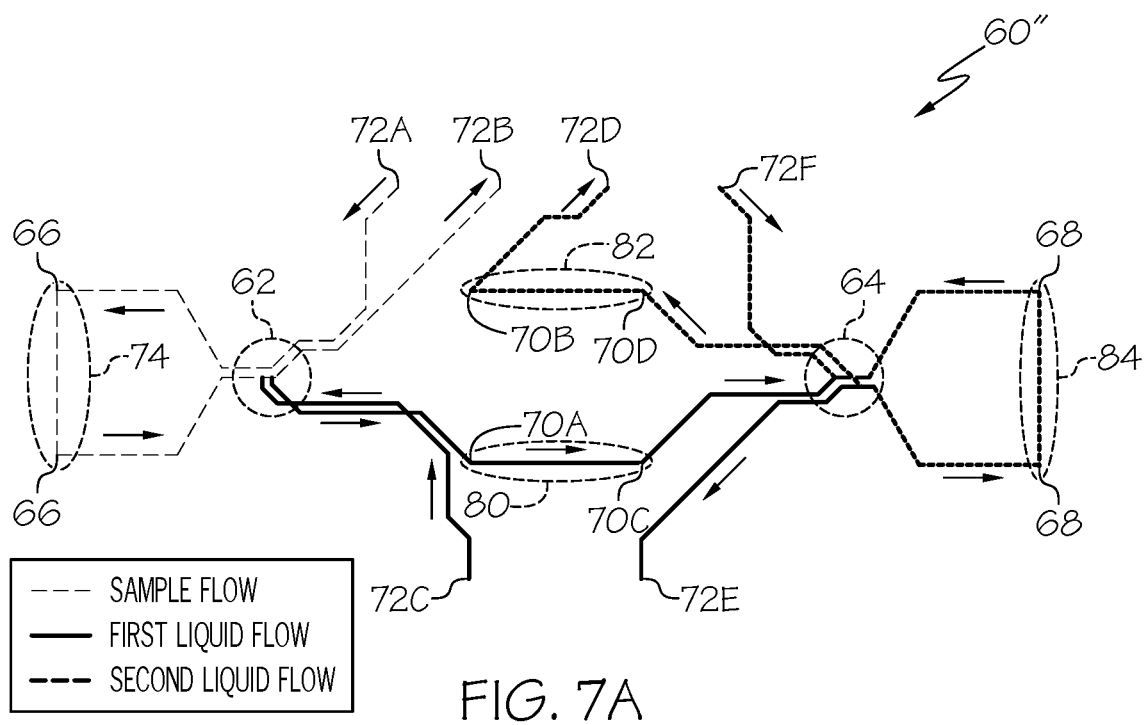
FIGS. 7A, 7B, 7C and 7D are schematic depictions of the flows conducted through the valve fluidic manifold of FIG. 6 during the procedure.
Figure 7B:
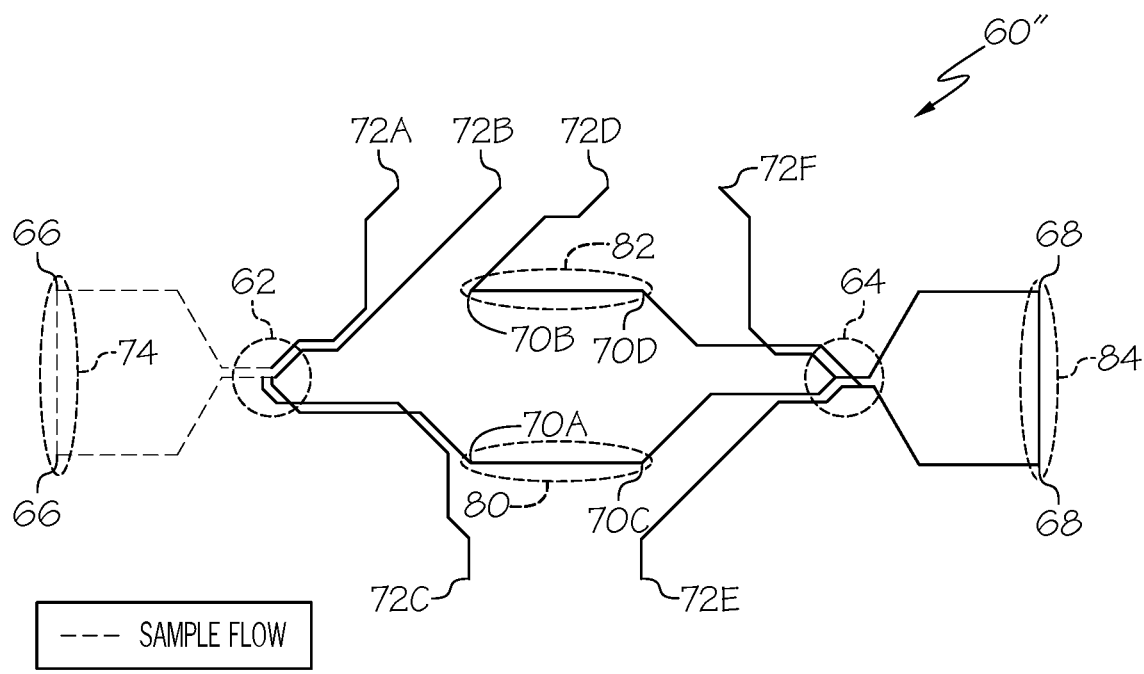
Figure 7C:
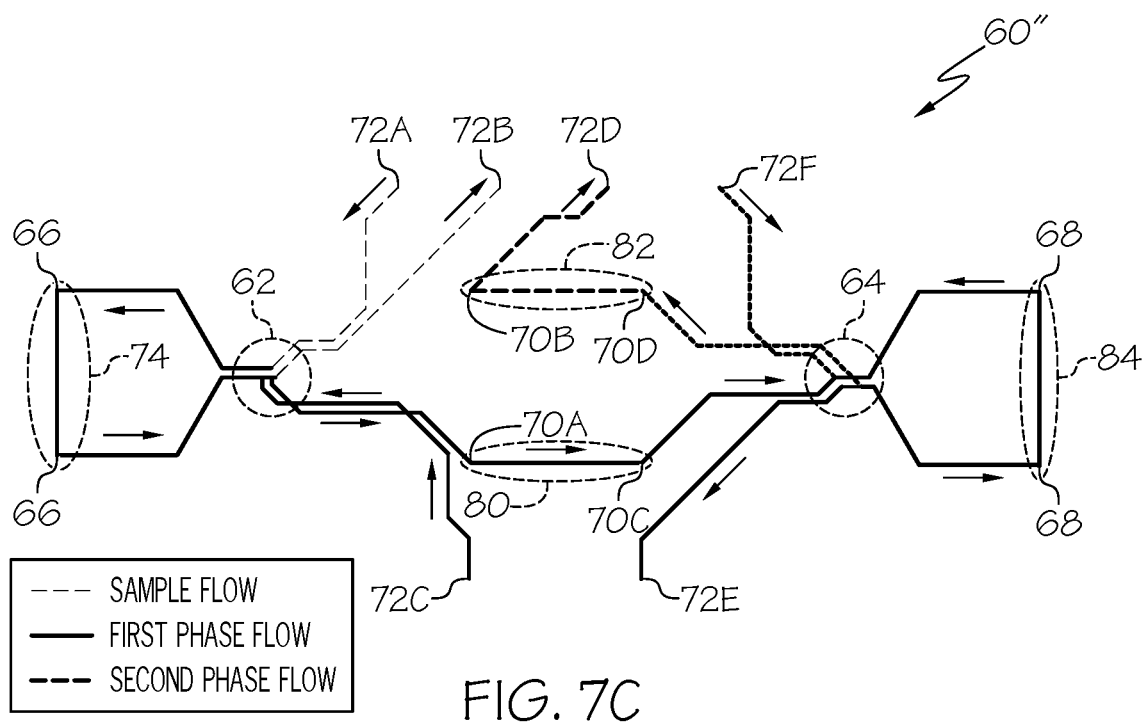
Figure 7D:
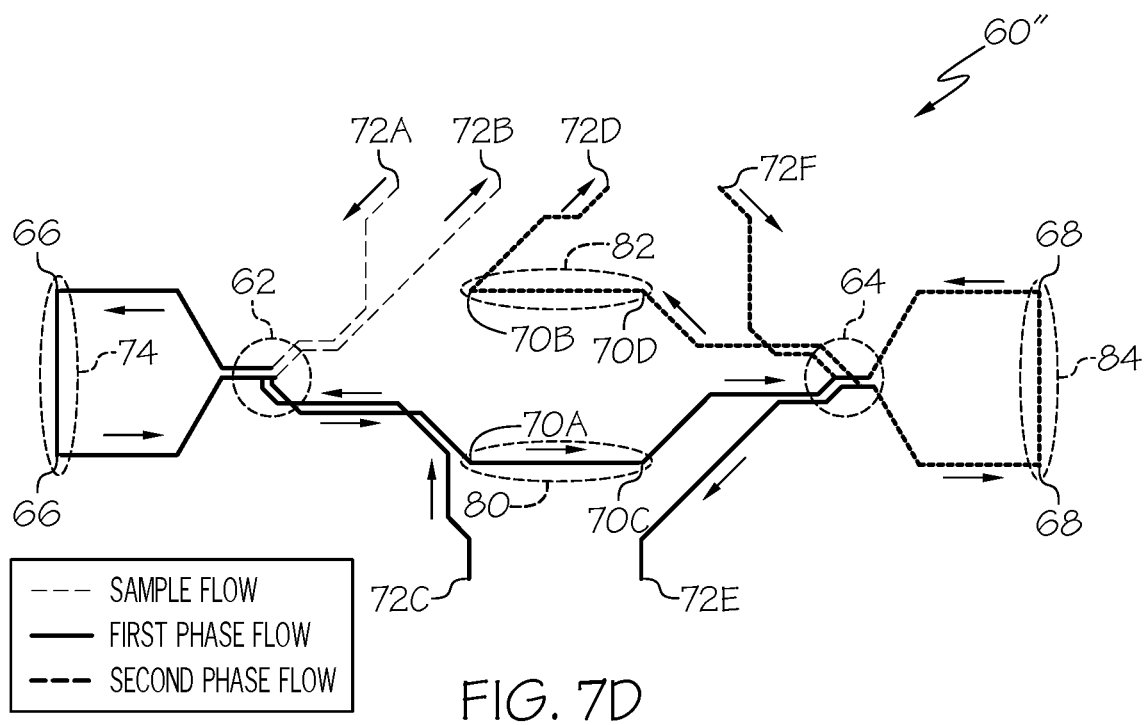

FIGS. 7A to 7D are schematic depictions of the flows conducted through the valve fluidic manifold 60" of FIG. 6 during the procedure. In FIGS. 7A, 7C and 7D, bold line segments indicate active flow paths with arrows used to indicate the direction of flow. A flow of sample received at port 72A is conducted by way of intervening fluidic channels through the rotary valve at location 62, through the external sample loop 74, through the rotary valve a second time, and out from the manifold block 60" at port 72B to waste. At the same time, a first liquid comprising one or more solvents received at port 72C is conducted through intervening fluidic channels through the first rotary valve (i.e., the valve at location 62), the first fluidic jumper 80, the second rotary valve (i.e., the valve at location 64), and out through port 72D. Concurrently, a second liquid comprising one or more solvents and being of different composition than the first liquid is received at port 72F. The second liquid is conducted through microfluidic channels such that it flows through the second rotary valve, the trap 84 and second fluidic jumper 82 before exiting at port 72D.

After completing the loading step, the external sample loop 74 and the fluidic channels that couple the sample loop 74 to the first rotary valve are filled with a known volume of sample, as shown by the bolded line segments in FIG. 7B. Subsequently, the first rotary valve is switched to reconfigure the fluidic paths as shown in FIG. 7C so that the first liquid received at port 72C is conducted through the first rotary valve and through the external sample loop 74 such that the known volume of sample is pushed through the first rotary valve, the first fluidic jumper 80 and the trap 84 before exiting at port 72E to waste. Analytes of interest are retained on the trap 84 as the sample volume passes through the trap 84. The second liquid received at port 72F flows to the second rotary valve and exits at port 72D.

Subsequently, the second rotary valve is switched to reconfigure the fluidic paths as shown in FIG. 7D so that the first liquid received at port 72C flows through the first rotary valve, the external sample loop 74, again through the first rotary valve, through the first fluidic jumper 80 and finally through the second rotary valve before exiting at port 72E. Concurrently, the second liquid received at port 72F flows through the second rotary valve, the trap 84, again through the second rotary valve and finally through the second fluidic jumper 82 before exiting at port 72D where the flow continues to the chromatographic column. The second liquid comprises at least one solvent that releases the retained analytes from the trap 84 so that the analytes are carried in the flow to the column for chromatographic separation.

Differential Flow Sensor

Figure 8:
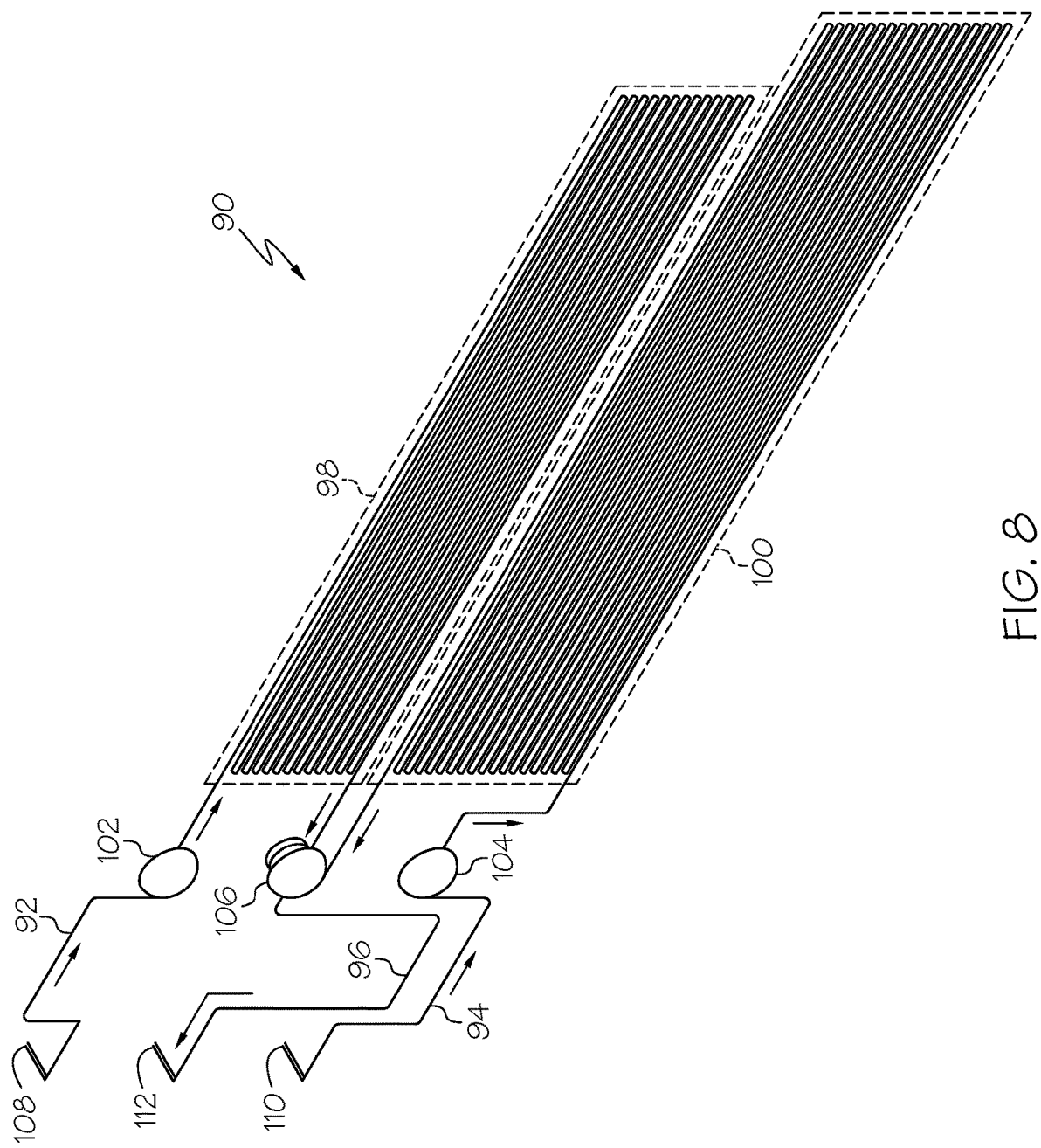
FIG. 8 is a schematic depiction of the fluidic channels in an example of a differential flow sensor formed in a diffusion bonded block.

FIG. 8 illustrates the fluidic channels in an example of a differential flow sensor 90 formed in a diffusion bonded block. The view omits the solid material of the block for clarity. The differential flow sensor 90 includes a first microfluidic channel 92 to conduct a solvent (channel A to conduct solvent A), a second microfluidic channel 94 to conduct a different solvent (channel B to conduct solvent B) and a third microfluidic channel 96 to conduct a mixture of solvent A and solvent B. The differential flow sensor 90 also includes a first restrictor and a second restrictor (designated by the enclosed regions within dashed lines 98 and 100, respectively), and three solvent pressure sensors 102, 104 and 106. Each of the two restrictors 98 and 100 is formed as a microfluidic channel having a serpentine path. As illustrated, the restrictor 100 for solvent B has a longer path length than the restrictor 98 for solvent A, and therefore provides a greater restriction to flow if both microfluidic channels in the restrictors have the same cross-section. The microfluidic channels and solvent pressure sensors of the differential flow sensor 90 may be formed in the diffusion bonded block as described for the examples provided above for a pump head manifold and a valve manifold.

The differential flow sensor 90 may be used in a solvent manager of a liquid chromatography system in which two solvents are mixed to form a mobile phase. Generally, the relative contributions of the solvents change in time according to a gradient composition; however, this is not a requirement.

During operation, one solvent (solvent A) received at an inlet port 108 of microfluidic channel 92 flows through pressure sensor 102, restrictor 98 and pressure sensor 106. The other solvent (solvent B) received at an inlet port 110 of microfluidic channel 94 flows through pressure sensor 104, restrictor 100 and pressure sensor 106. Solvents A and B are mixed proximate to or at the cavity of pressure sensor 106 so that the flow exiting the outlet port 112 of the third microfluidic channel 96 includes the solvent mixture. A determination of a pressure drop across the first restrictor 98 is made by determining a difference of the pressures measured by pressure sensors 102 and 106. Similarly, a determination of the pressure drop across the second restrictor 100 is made by determining a difference of the pressures measured by pressure sensors 104 and 106. The determined values of the pressure drops across the first restrictor 98 and the second restrictor 100 can be used to determine the flow rates of solvents A and B, respectively. The determination of the two flow rates can be used to ensure a proper solvent composition and flow rate for the solvent mixture delivered by the solvent manager.

The differential flow sensor 90 has multiple advantages over a conventional flow sensor arrangement for a solvent manager in which the restrictors may be elements formed by external tubing. First, the microfluidic channels in the diffusion bonded block are formed with more accurately controlled dimensions than external tubing which typically has poor tolerancing on the tubing ID. Thus, the performance variation for differential flow sensors described above will be substantially less than the performance variation for conventional differential flow sensors. In addition, there are fewer manual fluidic couplings that need to be made to use the diffusion bonded differential flow sensor in a solvent manager or other fluidic system, resulting in fewer leaks and less dead volume.

While the invention has been shown and described with reference to specific embodiments, it should be understood by those skilled in the art that various changes in form and detail may be made therein without departing from the scope of the invention as recited in the accompanying claims.

What is claimed is:

1. A reconfigurable fluidic manifold comprising:
   a block comprising a plurality of layers each joined by bonding to at least one adjacent one of the other layers at an interface, the block having a plurality of surfaces, a first fluidic channel and a second fluidic channel, each of the first and second fluidic channels at least partially disposed at one of the interfaces of the layers and having a first end and a second end; and
   a plunger chamber extending from one of the surfaces into the block, wherein the first end of the first fluidic channel is in fluidic communication with the plunger chamber to deliver a fluid to the plunger chamber and wherein the first end of the second fluidic channel is in fluidic communication with the plunger chamber to receive a fluid from the plunger chamber.

2. The reconfigurable fluidic manifold of claim 1 wherein the fluidic channels are microfluidic channels.

3. The reconfigurable fluidic manifold of claim 1 wherein each layer is joined by diffusion bonding to at least one adjacent one of the other layers at the interface.

4. The reconfigurable fluidic manifold of claim 1 further comprising an inlet port disposed at the second end of the first fluidic channel at one of the surfaces of the block and configured to receive the fluid from an external source.

5. The reconfigurable fluidic manifold of claim 1 further comprising an outlet port disposed at the second end of the second fluidic channel at one of the surfaces of the block and configured to deliver a pressurized fluid.

6. The reconfigurable fluidic manifold of claim 1 wherein one of the surfaces of the block has a check valve receptacle configured to receive a check valve.

7. The reconfigurable fluidic manifold of claim 1 wherein the block comprises a pressure sensor cavity disposed in one of the first and second fluidic channels.

8. The reconfigurable fluidic manifold of claim 1 wherein the check valve receptacle is disposed along the first fluidic channel.

9. The reconfigurable fluidic manifold of claim 1 wherein the plunger chamber is a first plunger chamber, the reconfigurable fluidic manifold further comprising a second plunger chamber extending from one of the surfaces into the block, wherein the second end of the second fluidic channel is in fluidic communication with the second plunger chamber to receive a fluid from the first plunger chamber.

10. The reconfigurable fluidic manifold of claim 9 wherein a volume of the first plunger chamber is larger than a volume of the second plunger chamber.

11. The reconfigurable fluidic manifold of claim 1 further comprising a third fluidic channel having a first end in fluidic communication with the second plunger chamber and having a second end.

12. The reconfigurable fluidic manifold of claim 11 further comprising an outlet port disposed at a second end of the third fluidic channel at one of the surfaces of the block.

13. The reconfigurable fluidic manifold of claim 1 further comprising a pump actuator block having a surface with a plunger that extends through the surface, the pump actuator block secured to one of the surfaces of the block wherein the plunger extends into the plunger chamber.

14. The reconfigurable fluidic manifold of claim 1 wherein the surface of the block from which the plunger chamber extends includes a recessed region, the pump head assembly further comprising a seal disposed in the recessed region and configured to seal against an outer diameter of a plunger.

* * * * *